(12) United States Patent
Jang

(10) Patent No.: US 12,277,009 B2
(45) Date of Patent: Apr. 15, 2025

(54) DISPLAY DEVICE

(71) Applicant: SAMSUNG DISPLAY CO., LTD., Yongin-si (KR)

(72) Inventor: Hyeji Jang, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 14 days.

(21) Appl. No.: 17/812,329

(22) Filed: Jul. 13, 2022

(65) Prior Publication Data

US 2023/0152856 A1 May 18, 2023

(30) Foreign Application Priority Data

Nov. 15, 2021 (KR) .................. 10-2021-0156403

(51) Int. Cl.
*G06F 1/16* (2006.01)
(52) U.S. Cl.
CPC .......... *G06F 1/1652* (2013.01); *G06F 1/1656* (2013.01)
(58) Field of Classification Search
CPC .............................. G06F 1/1652; G06F 1/1656
See application file for complete search history.

(56) References Cited

U.S. PATENT DOCUMENTS

| | | | |
|---|---|---|---|
| 9,569,018 B2* | 2/2017 | Kang | G06F 3/03 |
| 10,164,208 B2* | 12/2018 | Lee | B32B 3/30 |
| 10,345,856 B2* | 7/2019 | Song | G06F 1/1616 |
| 10,396,304 B2* | 8/2019 | Watabe | G06F 1/1652 |
| 10,564,326 B2* | 2/2020 | Namkung | G06F 3/0412 |
| 11,049,423 B1* | 6/2021 | Wang | G06F 1/1652 |
| 11,127,923 B2* | 9/2021 | Chen | H10K 59/131 |
| 11,175,693 B2* | 11/2021 | Song | G09G 3/3208 |
| 11,610,520 B2* | 3/2023 | Park | G06F 1/1641 |
| 11,644,613 B2* | 5/2023 | Yamamoto | F21V 17/101 |
| | | | 362/97.1 |
| 11,656,655 B2* | 5/2023 | Shin | G06F 1/1643 |
| | | | 361/679.27 |
| 11,670,199 B2* | 6/2023 | Kang | G06F 1/1652 |
| | | | 361/679.01 |
| 11,675,393 B2* | 6/2023 | Kim | B32B 15/095 |
| | | | 361/679.27 |
| 2018/0053451 A1* | 2/2018 | Han | G06F 1/1652 |
| 2018/0190936 A1* | 7/2018 | Lee | B32B 3/30 |

(Continued)

FOREIGN PATENT DOCUMENTS

| | | |
|---|---|---|
| KR | 10-2017-0020590 | 2/2017 |
| KR | 10-2017-0070309 | 6/2017 |

(Continued)

*Primary Examiner* — Rockshana D Chowdhury
(74) *Attorney, Agent, or Firm* — F. CHAU & ASSOCIATES, LLC

(57) ABSTRACT

A display device includes a display panel, a support member supporting the display panel and including a perforated portion in which a plurality of openings are formed, and an adhesive layer disposed between the display panel and the support member, and at least partially filling the plurality of openings. Because adhesive material of the adhesive layer at least partially fills the plurality of openings, adhesion reliability between the support member and the buffer member is improved. For this reason, the adhesive layer may not peel off from the support member over time, and the reliability of the display device is improved.

18 Claims, 11 Drawing Sheets

(56) References Cited

U.S. PATENT DOCUMENTS

| | | | |
|---|---|---|---|
| 2020/0166970 A1* | 5/2020 | Yeom | H04M 1/0268 |
| 2020/0272204 A1* | 8/2020 | Su | G09F 9/301 |
| 2021/0090475 A1* | 3/2021 | Wang | G06F 1/1616 |
| 2021/0118337 A1* | 4/2021 | Park | G09F 9/301 |
| 2021/0174711 A1* | 6/2021 | Cho | H10K 59/40 |
| 2021/0311525 A1* | 10/2021 | Seo | H04M 1/0268 |
| 2021/0365132 A1* | 11/2021 | Jung | G06F 1/1643 |
| 2021/0407344 A1* | 12/2021 | Lee | H10K 59/131 |
| 2022/0058989 A1* | 2/2022 | Chen | G06F 1/1626 |
| 2022/0198966 A1* | 6/2022 | Park | G09F 9/301 |
| 2022/0201879 A1* | 6/2022 | Kwak | G06F 1/1641 |

FOREIGN PATENT DOCUMENTS

| | | |
|---|---|---|
| KR | 10-2018-0062271 | 6/2018 |
| KR | 10-2021-0042206 | 4/2021 |

\* cited by examiner

DA:DA1,DA2

DA:DA1,DA2

330:331,332,333,334,335,336

DISPLAY DEVICE

CROSS-REFERENCE TO RELATED APPLICATION

This application claims priority from and the benefit of Korean Patent Application No. 10-2021-0156403, filed on Nov. 15, 2021, which is hereby incorporated by reference for all purposes as if fully set forth herein.

FIELD

This disclosure relates generally to display devices and more particularly to improvements in the structural integrity of flexible display devices.

DISCUSSION OF THE RELATED ART

With recent technological advances, small, lightweight display devices are commercially available with performance improvements in functionality and reduced power consumption. To this end, various types of display devices on the market today include liquid crystal displays (LCDs), light emitting displays (LEDs) such as organic LEDs (OLEDs) and active-matrix OLEDs, and quantum dot displays.

Consumer demand has also risen for flexible display devices including a foldable display device and a slidable display device.

SUMMARY

Embodiments described herein provide a display device with improved reliability.

A display device according to illustrative embodiments may include a display panel, a support member supporting the display panel and including a perforated portion in which a plurality of openings are formed, and an adhesive layer disposed between the display panel and the support member, and at least partially filling the plurality of the openings.

In an embodiment, the display device may further include a buffer member disposed between the display panel and the adhesive layer, and including a plurality of protrusions protruding toward the adhesive layer.

In an embodiment, the plurality of protrusions may overlay respective ones of the plurality of openings.

In an embodiment, a shape of each of the plurality of protrusions may be the same as a shape of each of the plurality of openings in a plan view.

In an embodiment, a width of each of the plurality of protrusions may be the same as a width of each of the plurality of openings.

In an embodiment, the adhesive layer may contact the support member and the buffer member.

In an embodiment, the display panel may include a flat area and a flexible area adjacent to the flat area. The perforated portion may overlap the flexible area.

In an embodiment, the support member may further include a main support portion underlaying the flat area. No hole may be formed in the main support portion.

In an embodiment, the adhesive layer may underlay the flat area and the flexible area.

In an embodiment, the plurality of protrusions may underlay the flat area and the flexible area.

In an embodiment, in the flat area, a bottom surface of the buffer member may be flat.

In an embodiment, the plurality of openings may penetrate the support member.

In an embodiment, the support member may include a surface facing the display panel, and the adhesive layer may cover the surface of the support member.

A display device according to embodiments may include a display panel including a flat area and a flexible area adjacent to the flat area, a buffer member disposed under the display panel and including a plurality of protrusions protruding downward, a support member disposed under the buffer member and including a perforated portion in which a plurality of openings underlaying the plurality of protrusions in the flexible area are formed, and an adhesive layer disposed between the buffer member and the support member, and at least partially filling the plurality of openings.

In an embodiment, a shape of each of the plurality of protrusions may be the same as a shape of each of the plurality of openings in a plan view.

In an embodiment, a width of each of the plurality of protrusions may be the same as a width of each of the plurality of openings.

In an embodiment, the adhesive layer may contact the support member and the buffer member.

In an embodiment, the plurality of openings may penetrate the support member.

In an embodiment, the support member may include a surface facing the display panel, and the adhesive layer may cover the surface of the support member.

In an embodiment, the plurality of protrusions may overlap the flat area and the flexible area.

A display device according to embodiments may include a support member including a perforated portion in which a plurality of openings are formed, an adhesive layer disposed on the support member, and a buffer member disposed on the adhesive layer. In embodiments where the buffer member includes a plurality of protrusions protruding toward the adhesive layer, adhesive material of the adhesive layer may at least partially fill the plurality of openings. Accordingly, adhesion reliability between the support member and the buffer member may be improved. Accordingly, the adhesive layer may not peel off from the support member, and reliability of the display device may be improved.

In another aspect, a display device includes a display panel, a support member and an adhesive layer. The support member underlays and supports the display panel and includes a flexible portion having a plurality of openings. The flexible portion forms, together with an overlaying portion of the display panel, a flexible area of the display device. The adhesive layer is disposed between the support member and the display panel and includes a first portion between an upper surface of the support member and the display panel, and a second portion that fills an upper portion of the plurality of openings. A lower portion of the plurality of openings is adhesive-free. The support member may further include a rigid portion adjacent to the flexible portion and underlaying a flat area of the display panel such that the flat area of the display panel corresponds to a rigid part of the display device.

BRIEF DESCRIPTION OF THE DRAWINGS

Illustrative, non-limiting embodiments will be more clearly understood from the following detailed description in conjunction with the accompanying drawings.

DETAILED DESCRIPTION OF EMBODIMENTS

Figure 1:
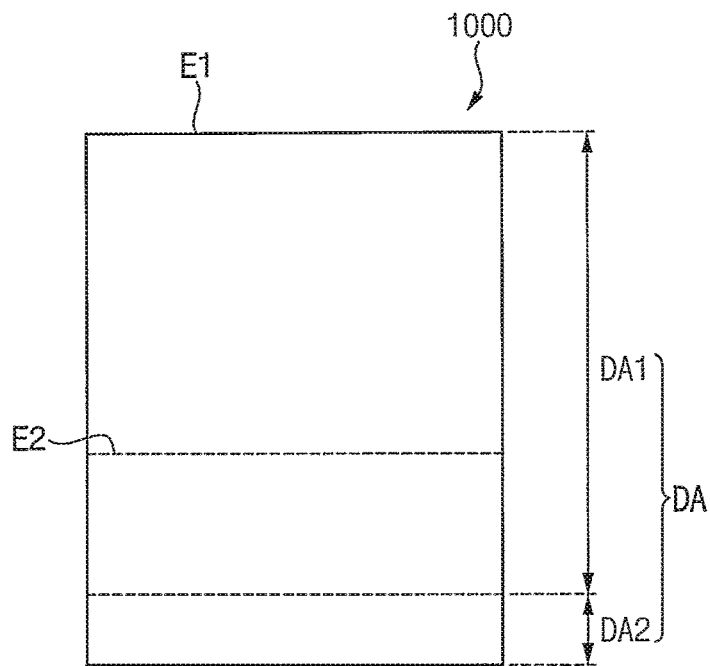
FIG. 1 is a plan view illustrating a first state of a display device according to an embodiment.

Hereinafter, embodiments of the present disclosure will be explained in detail with reference to the accompanying drawings. The same reference numerals are used for the same components in the drawings, and redundant descriptions of the same components will be omitted.

Figure 2:
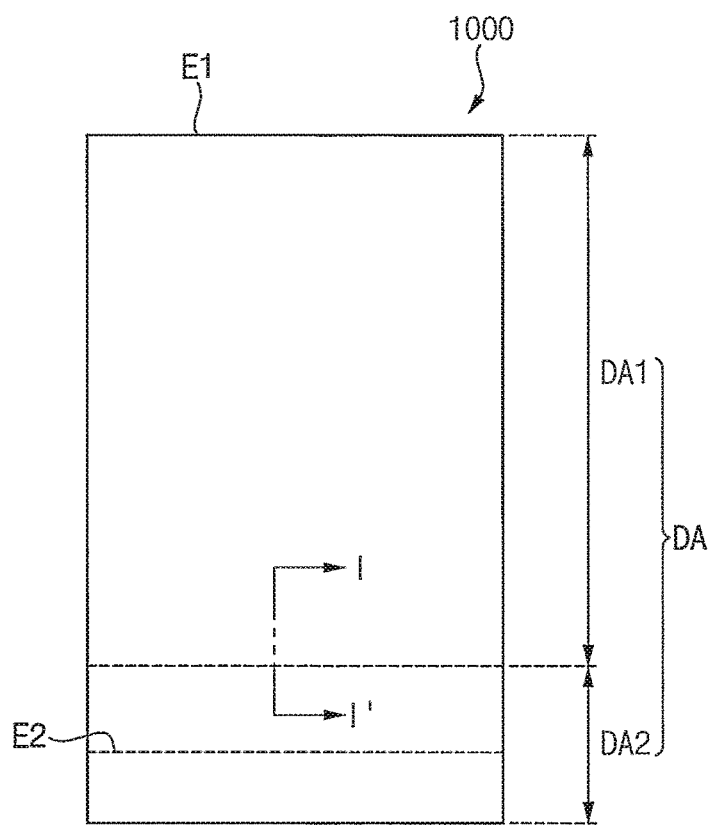
FIG. 2 is a plan view illustrating a second state of the display device of FIG. 1.
Figure 3:
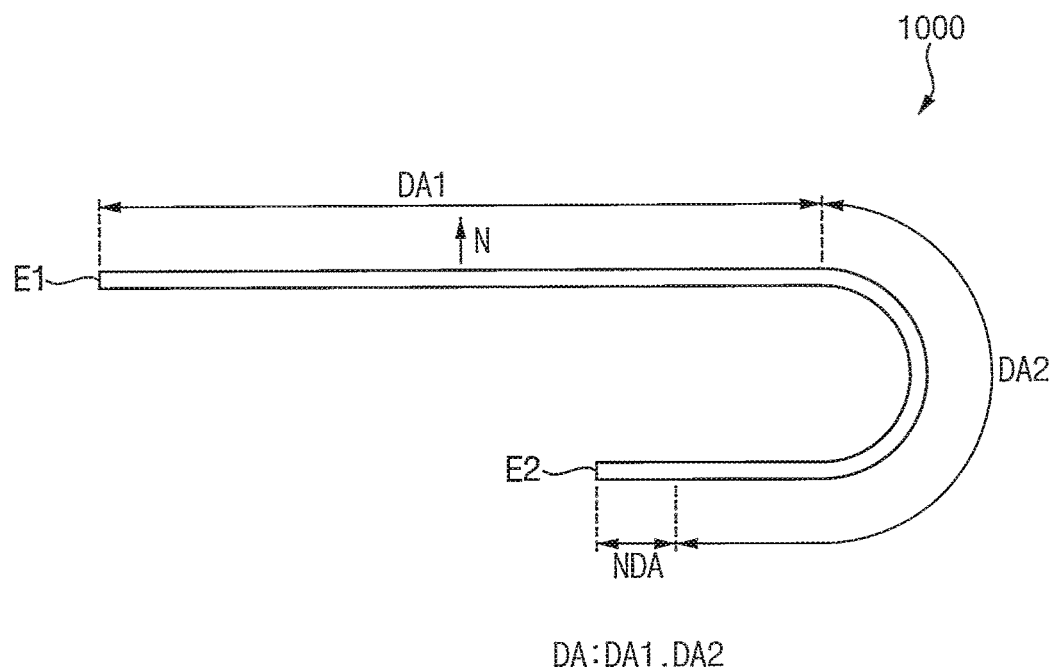
FIG. 3 is a side view illustrating the display device of FIG. 1.
Figure 4:
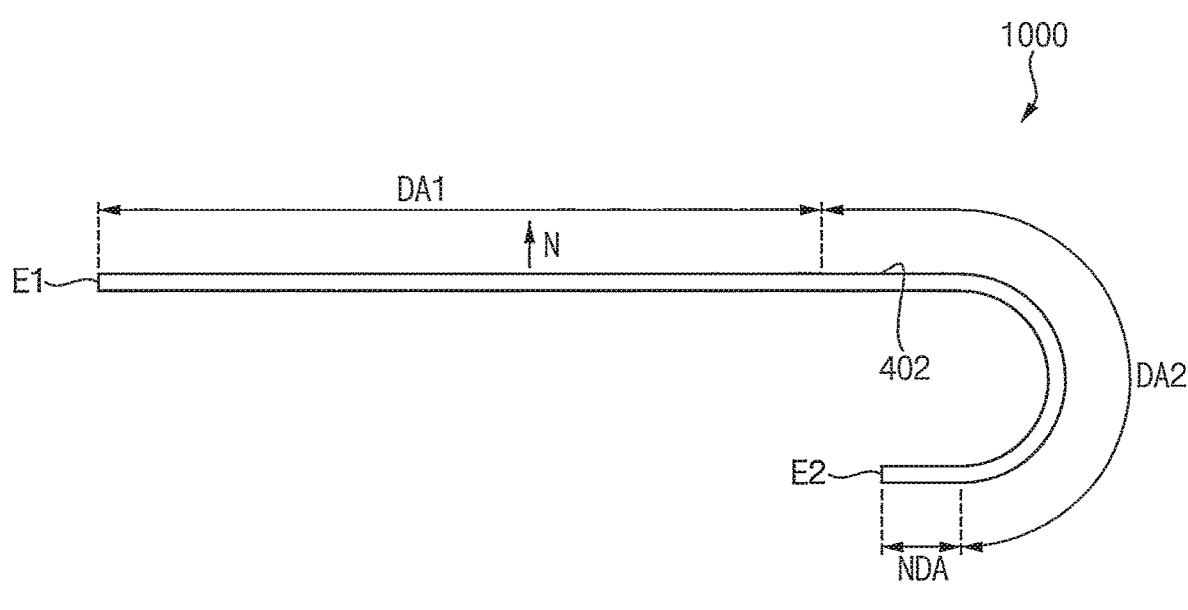
FIG. 4 is a side view illustrating the display device of FIG. 2.

FIG. 1 is a plan view illustrating a flexible display device 1000 according to an embodiment in a first folded state according to an embodiment. FIG. 2 is a plan view illustrating the display device 1000 in a second folded state. FIG. 3 is a side view illustrating the display device 1000 in the folded state of FIG. 1. FIG. 4 is a side view illustrating the display device 1000 in the folded state of FIG. 2.

Referring to FIGS. 1-4, the display device 1000 may include a display area DA and a non-display area NDA. The display area DA may include a flat area DA1 and a flexible area DA2. The display device 1000 may have a first edge E1 and an opposite, second edge E2. The flexible area DA2 may be manually flexed between a plurality of different folding states such as the first and second folding states in FIGS. 1-2. In some embodiments, the flexible area DA2 can be manually flexed to a flat state in a plane coplanar with the plane of the flat area DA1.

Light emitting pixels may be disposed in the display area DA. For example, each pixel may include a first pixel emitting red light, a second pixel emitting green light, and a third pixel emitting blue light. As the red light, the green light, and the blue light are combined, the display device 1000 may display an image in the display area DA. The flat area DA1 and the flexible area DA2 may each display a respective portion of an image frame generated by all the pixels of display device 1000.

The flat area DA1 may be rigid and unbendable during normal use of the display device 1000. This case is mainly discussed hereafter. In other embodiments, both the flat area DA1 and the flexible area DA2 are flexible.

In the example of FIGS. 3 and 4, the non-display area NDA is disposed adjacent the edge E2. In other embodiments, the non-display area NDA is disposed around the display area DA. The non-display area NDA may surround at least a portion of the display area DA. For example, the non-display area NDA may be adjacent to the flexible area DA2. A driver may be disposed in the non-display area NDA. The driver may provide a signal and/or a voltage to the pixel. For example, the driver may include a gate driver, a data driver, and the like. The non-display area NDA may not display an image. The driver may be bent toward a bottom surface of the display device 1000 so as to be hidden in a plan view of the display device 1000, even when the flexible area DA2 is fully flexed to a flat state.

In the example first folded state of FIGS. 1 and 3, the flexible area DA2 may be maximally flexed downward. In the example second folded state of FIGS. 2 and 4, the flexible area DA2 may be partially flexed downward. In this case, a surface portion 402 of flexible area DA2 may display a portion of an image projected in a direction N normal to the top surface of the flat area DA1. Display device 1000 may be configured to be flexed to any suitable number of folded states. When flexed to an unfolded state, the entire upper surface of flexible area DA2 may be coplanar with the top surface of flat area DA1.

The flat area DA1 may be disposed parallel to the same plane in both the first state and the second state. The flat area DA1 may be designed to be rigid and therefore unbendable under normal operations. The flat area DA1 may be larger than the flexible area. By configuring a relatively large, flat and unbendable area, the flat area DA1 may always remain flat within a tight tolerance range of flatness, without the need for manual user adjustment. In other embodiments, the area DA1 can be flexible through suitable design of a support member. When the area DA1 is also flexible, enhanced portability options such as a rolling up the entire display device 1000, may be available to users.

The flexible area DA2 may be adjacent to the flat area DA1. As mentioned, the flexible area DA2 may be bent toward the bottom surface of the flat area DA1 in the first state. Accordingly, most of the flexible area DA2 may not be viewable in the front plan view of the display device 1000 in the first state.

The surface portion 402 of the flexible area DA2 may be viewed in the plan view of the display device 1000 in the second state. Accordingly, the display device 1000 may display a relatively large image in the second state.

Figure 5:
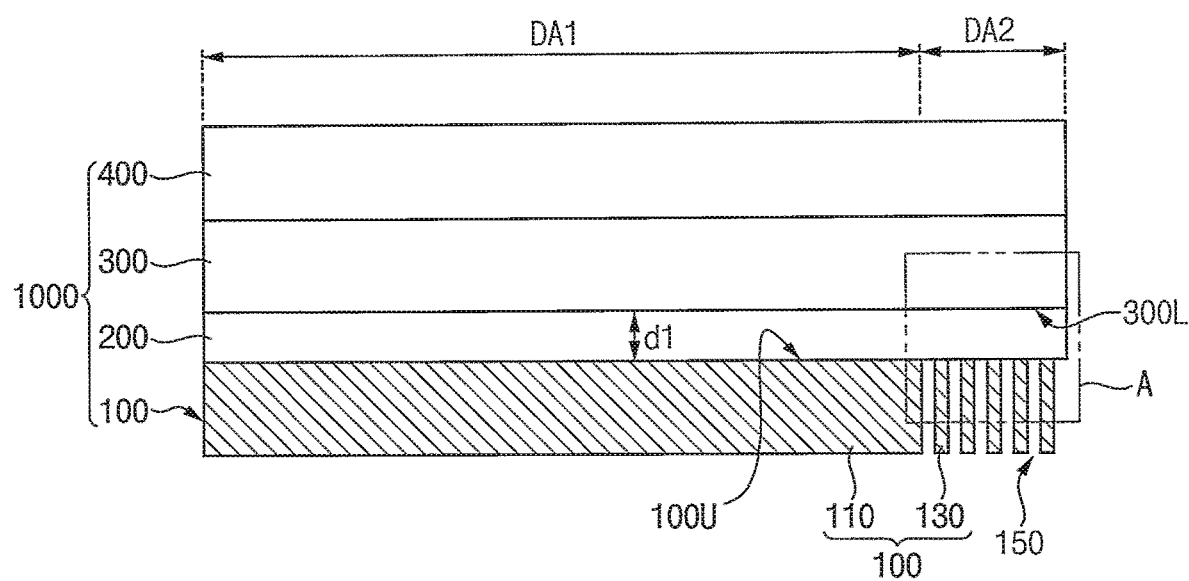
FIG. 5 is a cross-sectional view taken along line I-I' of FIG. 2.

FIG. 5 is a cross-sectional view taken along line I-I' of FIG. 2.

Referring to FIG. 5, the display device 1000 may include a support member 100, an adhesive layer 200, a buffer member 300, and a display panel 400.

The support member 100 may support the display panel 400. The support member 100 may be disposed under the display panel 400. The support member 100 may include an upper surface 100U facing the display panel 400.

The support member 100 may include a metal. Some examples of the metal may include invar, which is an alloy of nickel and iron, stainless steel (SUS), titanium, copper, and combinations thereof. In other embodiments, the support member 100 is composed of non-metallic materials, e.g., man-made materials such as a rubber-plastic composite.

The support member 100 may include a main support portion 110 and a perforated portion 130, where the perforated portion 130 includes a plurality of openings. The material of the perforated portion 130 may include elements arranged in a lattice structure, such as that illustrated in FIG. 6. As such, the second portion 130 may sometimes be interchangeably referred to as a "lattice portion". The perforated portion 130 may be flexible and therefore may sometimes be referred to as a flexible portion of the support member 100.

The main support portion 110 may underlay the flat area DA1, and may support the display panel 400 in the flat area DA1. The main support portion 110 may not include any openings and may therefore be more rigid than the perforated portion 130. Due to the rigidity of the main support portion 110 underlaying the flat area DA1, the flat area DA1 may also be rigid and unbendable during normal use of the display device 1000.

The perforated portion 130 may underlay the flexible area DA2. The perforated portion 130 may support the display panel 400 in the flexible area DA2. A plurality of openings 150 may be formed in the perforated portion 130. The plurality of openings 150 may penetrate the support member 100 in a thickness direction of the support member 100 (vertical direction in FIG. 5, which is also the direction of the normal N in FIG. 1). Accordingly, the display device 1000 may be smoothly transitioned from the first state to the second state.

The adhesive layer 200 may be disposed on the support member 100. The adhesive layer 200 may be disposed between the support member 100 and the display panel 400. The adhesive layer 200 may cover the upper surface 100U of the support member 100. For example, the adhesive layer 200 may underlay both the flat area DA1 and the flexible area DA2. The adhesive layer 200 may continuously extend across the flat area DA1 and the flexible area DA2. Thus, the adhesive layer 200 may extend from the edge E1 to a point proximate the edge E2 (see FIGS. 1-4) of the display device 1000. The adhesive layer 200 may include a pressure sensitive adhesive (PSA). The adhesive layer 200 may be defined as having three portions, described later in connection with FIG. 8. A first portion of adhesive layer 200 may occupy a volume with a vertical thickness d1. A second portion of adhesive layer 200 may occupy an upper portion of the openings 150. A third portion of adhesive layer 200 may occupy spaces between protrusions of the buffer member 300.

The buffer member 300 may be disposed on the adhesive layer 200. The buffer member 300 may be disposed under the display panel 400. Thus, the adhesive layer 200 may be disposed between the support member 100 and the buffer member 300. For example, the buffer member 300 may include a bottom surface 300L facing the adhesive layer 200. The adhesive layer 200 may contact the support member 100 and the buffer member 300. The adhesive layer 200 may attach the support member 100 to the buffer member 300.

The buffer member 300 may underlay the flat area DA1 and the flexible area DA2. The buffer member 300 may continuously extend across the flat area DA1 and the flexible area DA2. The buffer member 300 may include a buffer material. Some examples of the buffer material may include thermoplastic polyurethane (TPU), polyimide (PI), polyethylene terephthalate (PET), and combinations thereof. However, the buffer material is not limited thereto. For example, the buffer material may include a foam such as polyurethane foam. The buffer member 300 may cushion an external impact that may be applied to the display panel 400 and may protect the display panel 400.

The display panel 400 may be disposed on the buffer member 300. The display panel 400 may include a driving element, a light emitting element, and an encapsulation layer. The driving element may provide a signal and/or a voltage for the light emitting element to emit light. The light emitting element may emit light according to the signal and/or the voltage of the driving element. The encapsulation layer may protect the light emitting element by preventing penetration of moisture and oxygen from the exterior.

Although not shown, the window may be disposed on the display panel 400. The window may constitute a front surface of the display device 1000 and may protect the display panel 400. For example, the window may include ultra-thin glass (UTG), polymethyl methacrylate (PMMA), and the like.

Figure 6:
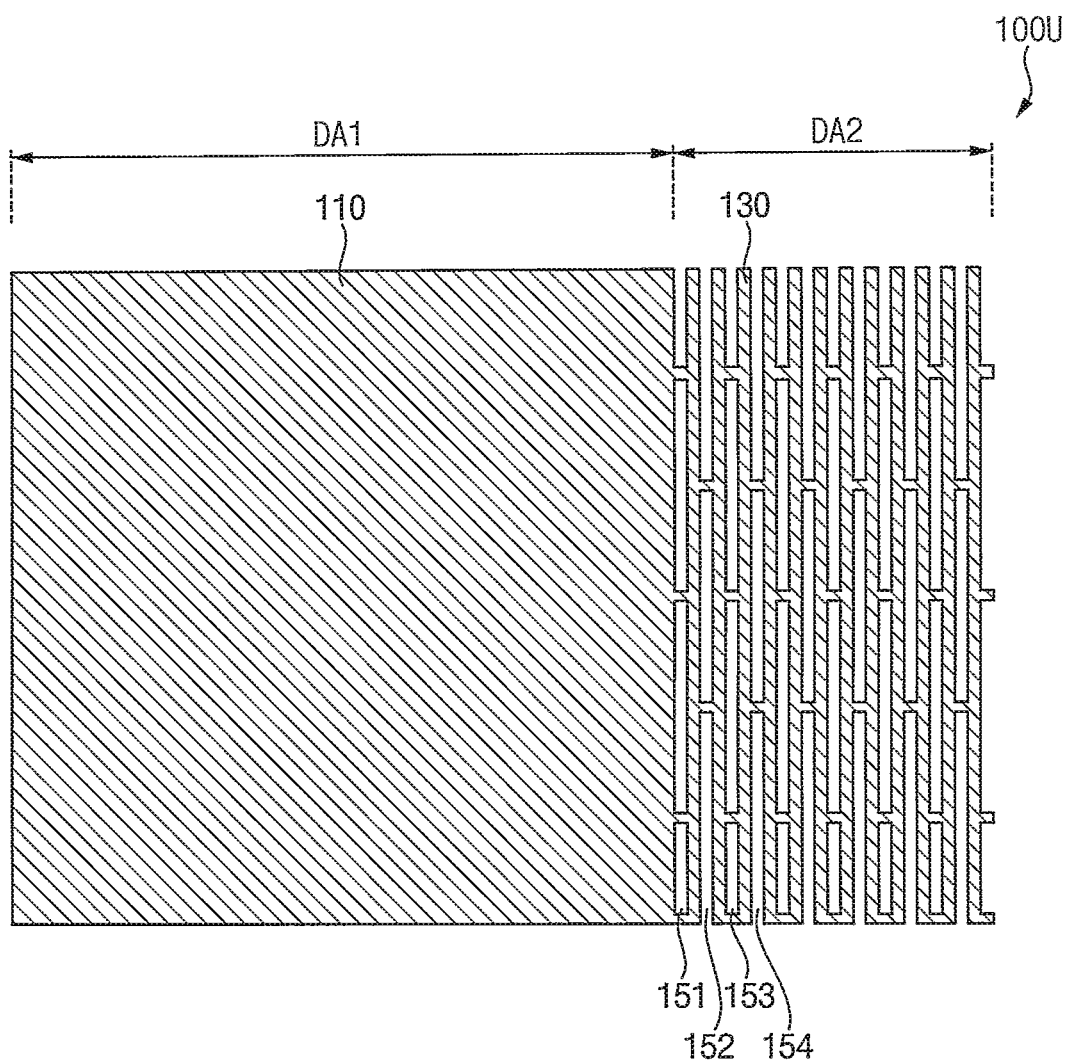
FIG. 6 is a plan view illustrating a support member included in the display device of FIG. 5.

FIG. 6 is a plan view illustrating a support member included in the display device of FIG. 5. For example, FIG. 6 is a plan view illustrating the upper surface 100U of the support member 100 included in the display device 1000 of FIG. 5.

Referring to FIG. 6, the support member 100 may include the main support portion 110, and the perforated portion 130 in which the plurality of openings 150 are formed. The support member 100 may continuously extend from the main support portion 110 underlaying the flat area DA1 to the perforated portion 130 underlaying the flexible area DA2. The main support portion 110 and the perforated portion 130 may be integrally formed.

The plurality of openings 150 may include a first opening 151, a second opening 152, a third opening 153, and a fourth opening 154. The number of openings 150 is not limited. The openings 150 may underlay the flexible area DA2. In the plan view, the shape and arrangement of each of the openings 150 are not limited. For example, each of the openings 150 may have a rectangular or other oblong shape in the plan view.

Figure 7:
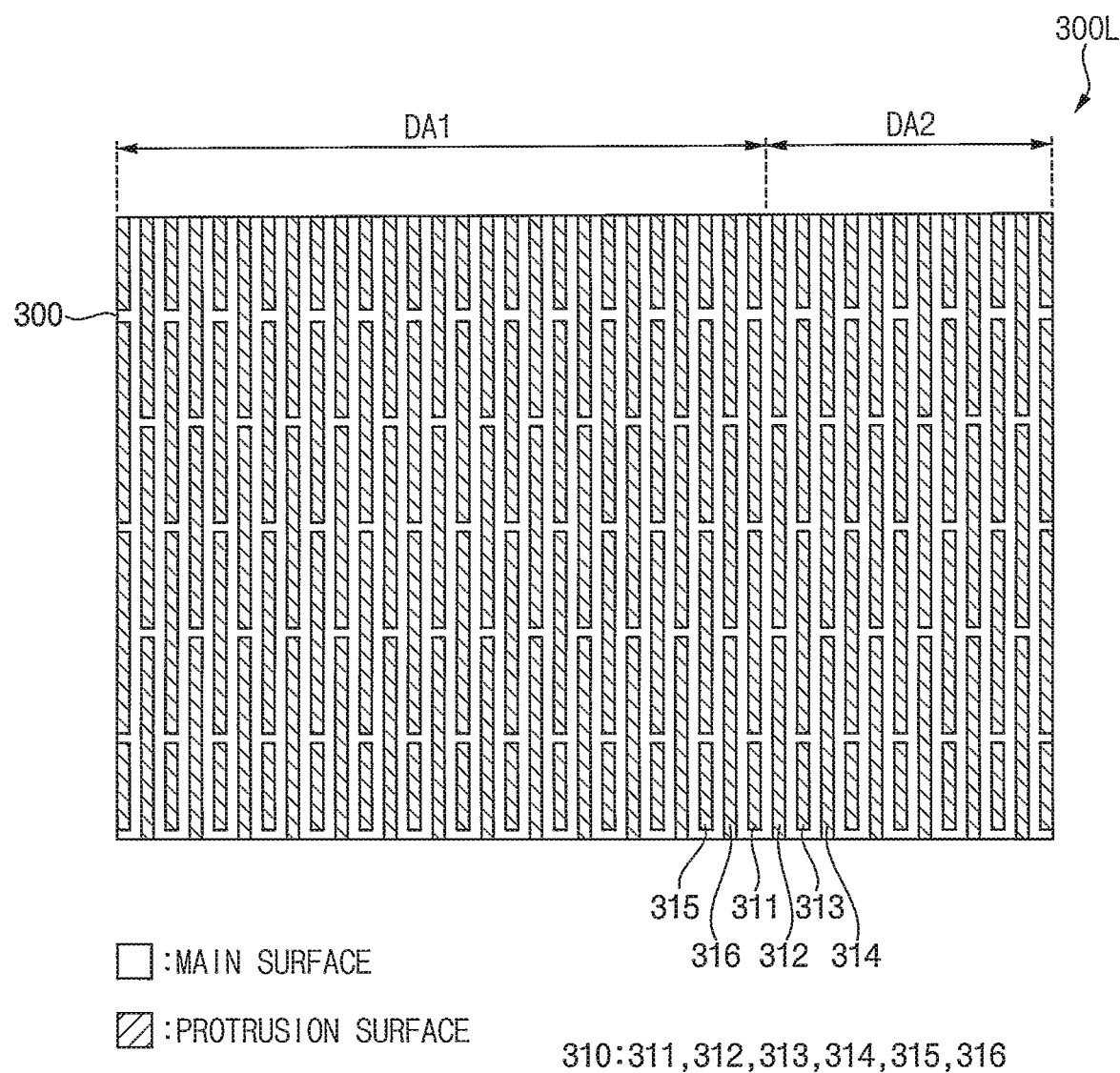
FIG. 7 is a bottom view illustrating an example of a buffer member included in the display device of FIG. 5.

FIG. 7 is a bottom view illustrating an example of a buffer member included in the display device of FIG. 5. For example, FIG. 7 is a bottom view illustrating the bottom surface 300L of the buffer member 300 included in the display device 1000 of FIG. 5.

Referring to FIG. 7, the buffer member 300 may continuously extend across a region beneath the flat area DA1 and the flexible area DA2. In an embodiment, the buffer member 300 may include a plurality of protrusions 310. The protrusions 310 may protrude downward. Thus, the plurality of protrusions 310 may protrude toward the adhesive layer 200 (refer to FIG. 5). (More precisely, the protrusions 310 may protrude toward the first portion of the adhesive layer 200, described later.) The protrusions 310 may include a first protrusion 311, a second protrusion 312, a third protrusion 313, a fourth protrusion 314, a fifth protrusion 315, and a sixth protrusion 316, and so on. The number of the plurality of protrusions 310 is not limited. The first, second, third, and fourth protrusions 311, 312, 313, and 314 may underlay the flexible area DA2, and the fifth and sixth protrusions 315 and 316 may underlay the flat area DA1. In FIG. 7, the cross-hatched areas represent lower surfaces of the protrusions 310 and the white areas represent areas of a main surface of the buffer member 300, recessed from the lower surfaces of the protrusions 310.

The protrusions 310 may be formed by a gravure printing process, a laser patterning process, or the like. However, other suitable processes may be substituted.

Figure 8:
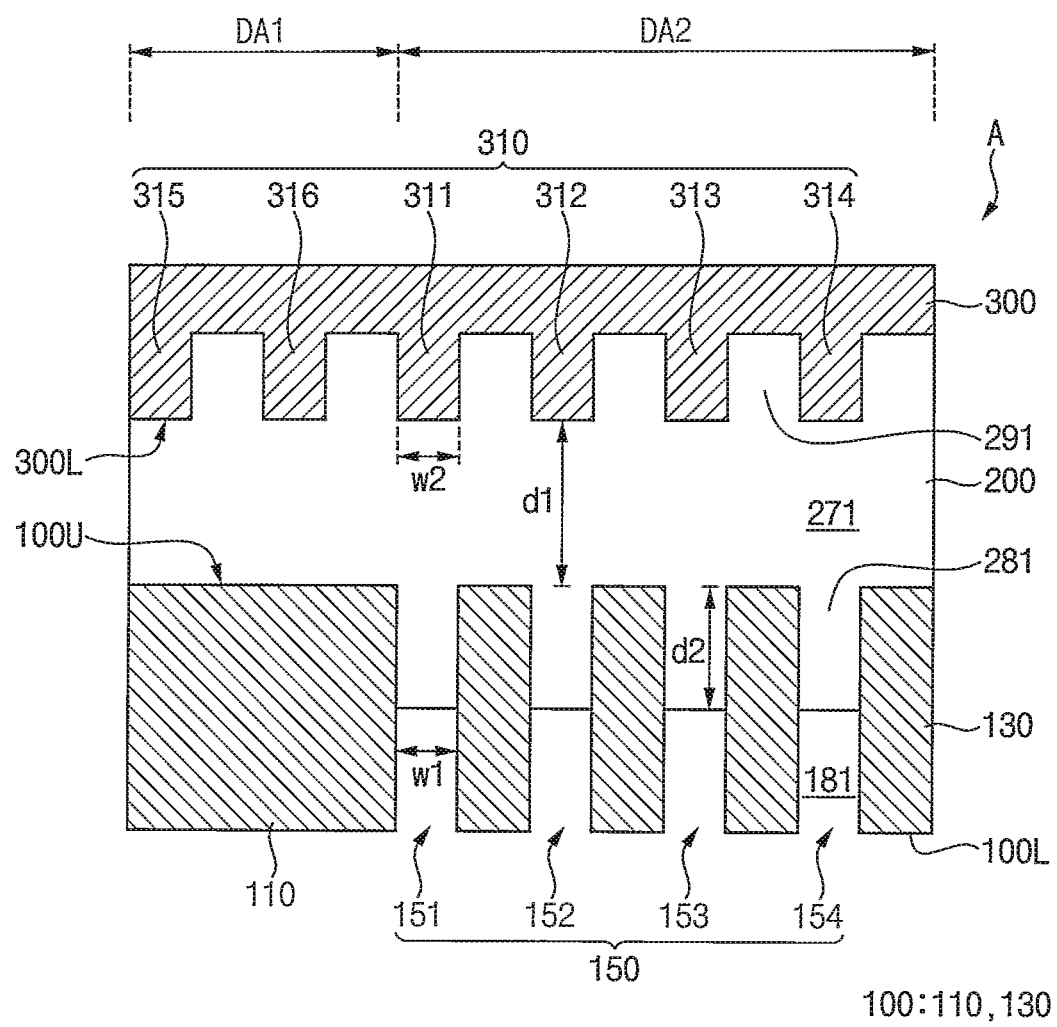
FIG. 8 is an enlarged cross-sectional view of an example of area 'A' of FIG. 5.

FIG. 8 is an enlarged cross-sectional view of an example of area 'A' of FIG. 5.

Referring to FIGS. 5 and 8, the adhesive layer 200 may at least partially fill the plurality of openings 150. Because the adhesive material of the adhesive layer 200 at least partially fills the plurality of openings 150, adhesion reliability between the support member 100 and the buffer member 300 may be improved. For example, even when the display device 1000 has repeatedly transitioned between the first state and the second state many times, the adhesive layer 200 may not peel off from the support member 100. In other words, the probability of the adhesive layer 200 peeling off from the support member 100 is reduced.

Referring to FIGS. 5, 6, 7, and 8, the first, second, third, and fourth protrusions 311, 312, 313, and 314 may correspond to the first, second, third, and fourth openings 151, 152, 153, and 154.

In an embodiment, each of the first, second, third, and fourth protrusions 311, 312, 313, and 314 may overlay (and be aligned with) the first, second, third, and fourth openings 151, 152, 153 and 154, respectively. A shape of each of the first, second, third, and fourth protrusions 311, 312, 313, and 314 may be substantially the same as a shape of each of the first, second, third, and fourth openings 151, 152, 153, and 154, respectively. A width w2 of each of the first, second, third, and fourth protrusions 311, 312, 313, and 314 (in the horizontal direction as illustrated) may be substantially equal to a width w1 of each of the first, second, third, and fourth openings 151, 152, 153, and 154, respectively. By designing the buffer member 300 including the plurality of protrusions 310 respectively overlaying the plurality of openings 150, having substantially the same cross-sectional shape as the cross-sectional shape of each of the plurality of openings 150, and having substantially the same width as the width w1 of each of the plurality of openings 150, the adhesive layer 200 may further fill the plurality of openings 150. Accordingly, adhesion reliability between the support member 100 and the buffer member 300 may be further improved. Thus, the adhesive layer 200 may not peel off from the support member 100, and reliability of the display device 1000 may be improved.

In an embodiment, the plurality of protrusions 310 may underlay the flat area DA1 and the flexible area DA2. Thus, the plurality of protrusions 310 may include the fifth and fourth protrusions 315 and 316 underlaying the flat area DA1 as well as the first, second, third, and fourth protrusions 311, 312, 313, and 314 underlaying the flexible area DA2. When the protrusions 310 are formed by the gravure printing process, because the protrusions 310 overlap both the flat area DA1 and the flexible area DA2, fabrication of the protrusions 310 may be facilitated.

The adhesive layer 200 may include a first portion 271, a second portion 281 and a third portion 291. The first portion 271 may occupy a volume with a vertical thickness d1 between a lower surface 300L of the buffer member 300 and an upper surface 100U of the support member 100. The second portion 281 may fill only an upper portion of the openings 150 (thereby only partially filling the openings 150). The second portion 281 may extend downward a distance d2 from the upper surface 100U of support member 100, e.g., about halfway down the openings 150. Thus, a lower portion 181 of each opening 150 may be adhesive-free. The lower portions 181 of the openings 150 may be unfilled with any material (thereby, the lower portions 181 may be occupied by air). Alternatively, the lower portions 181 of the openings 150 are filled with a flexible material. By leaving the lower portions 181 adhesive-free, the flexibility of flexible portion 130 may be maintained.

Figure 9:
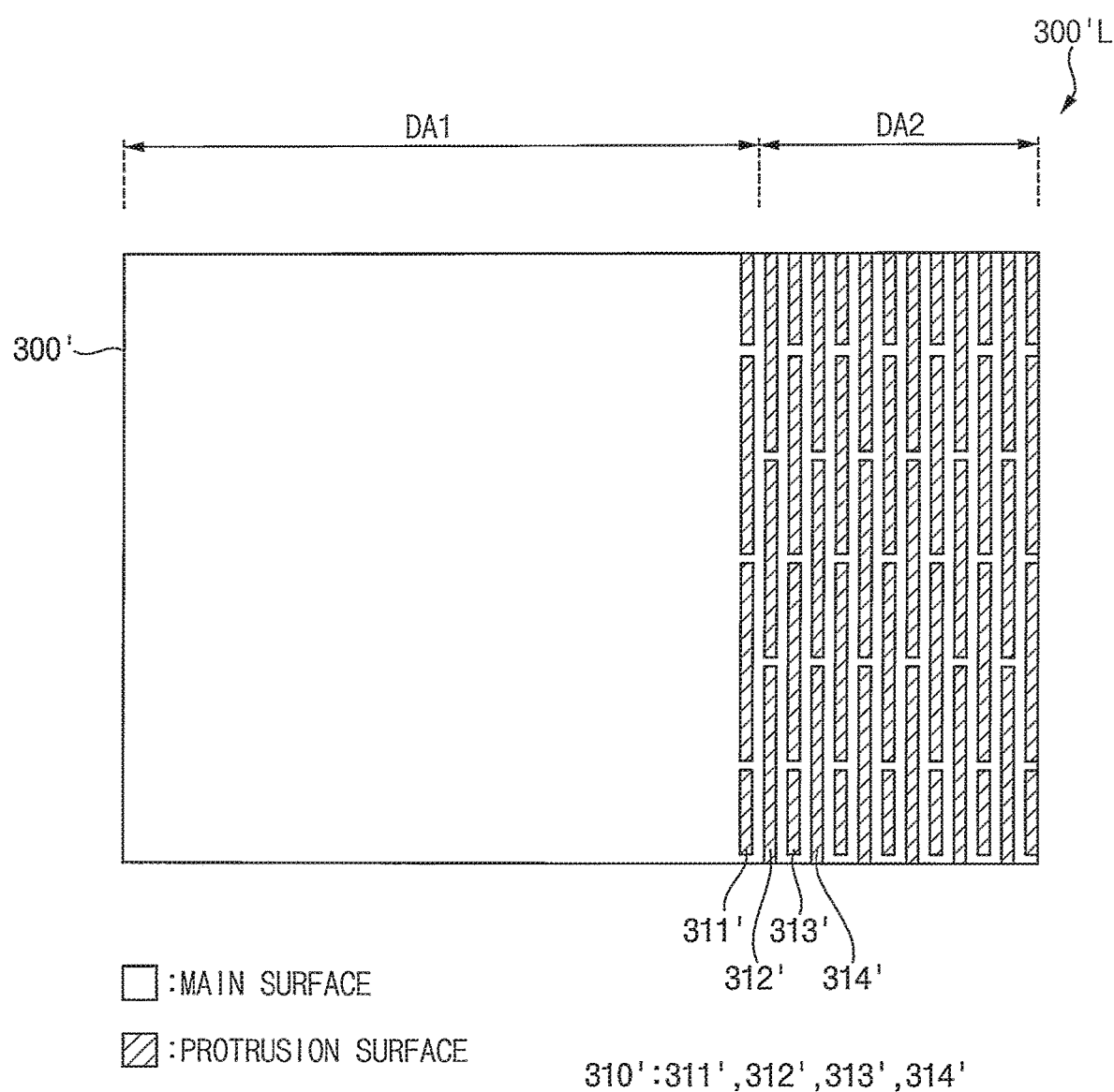
FIG. 9 is a bottom view illustrating another example of a buffer member included in the display device of FIG. 5.
Figure 10:
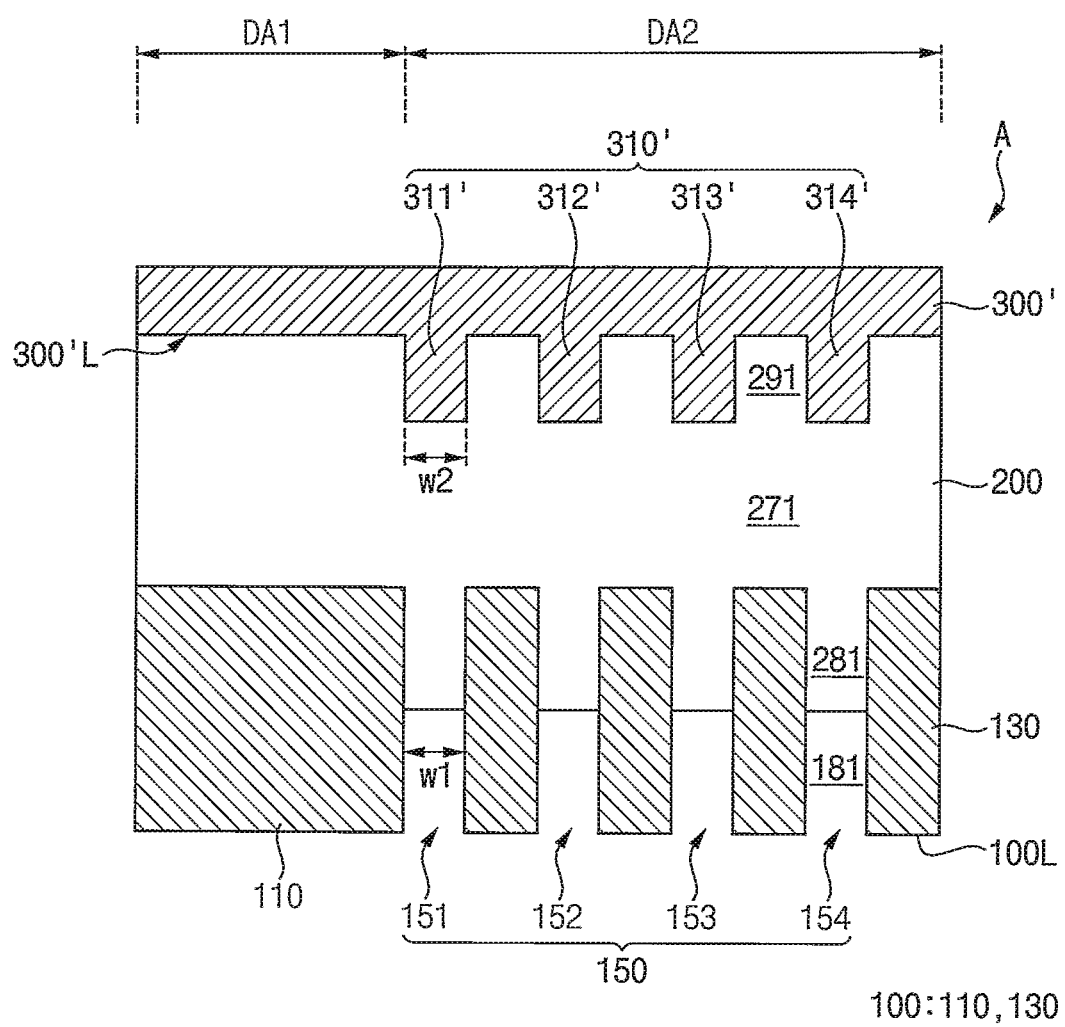
FIG. 10 is an enlarged cross-sectional view of another example of area 'A' of FIG. 5.

FIG. 9 is a bottom view illustrating another example of a buffer member included in the display device of FIG. 5. FIG. 10 is an enlarged cross-sectional view of another example of area 'A' of FIG. 5, when a buffer member 300' is substituted for the buffer member 300.

Referring to FIGS. 9 and 10, in the flat area DA1, a bottom surface 300'L of a buffer member 300' may be substantially flat. A plurality of protrusions 310' of the buffer member 300' may underlay only the flexible area DA2 and may not underlay the flat area DA1. For example, the plurality of protrusions 310' may include a first protrusion 311', a second protrusion 312', a third protrusion 313', and a fourth protrusion 314' overlaying the flexible area DA2.

When the protrusions 310' are formed by the laser patterning process, because the protrusions 310' underlay only the flexible area DA2, their fabrication may be facilitated.

Figure 11:
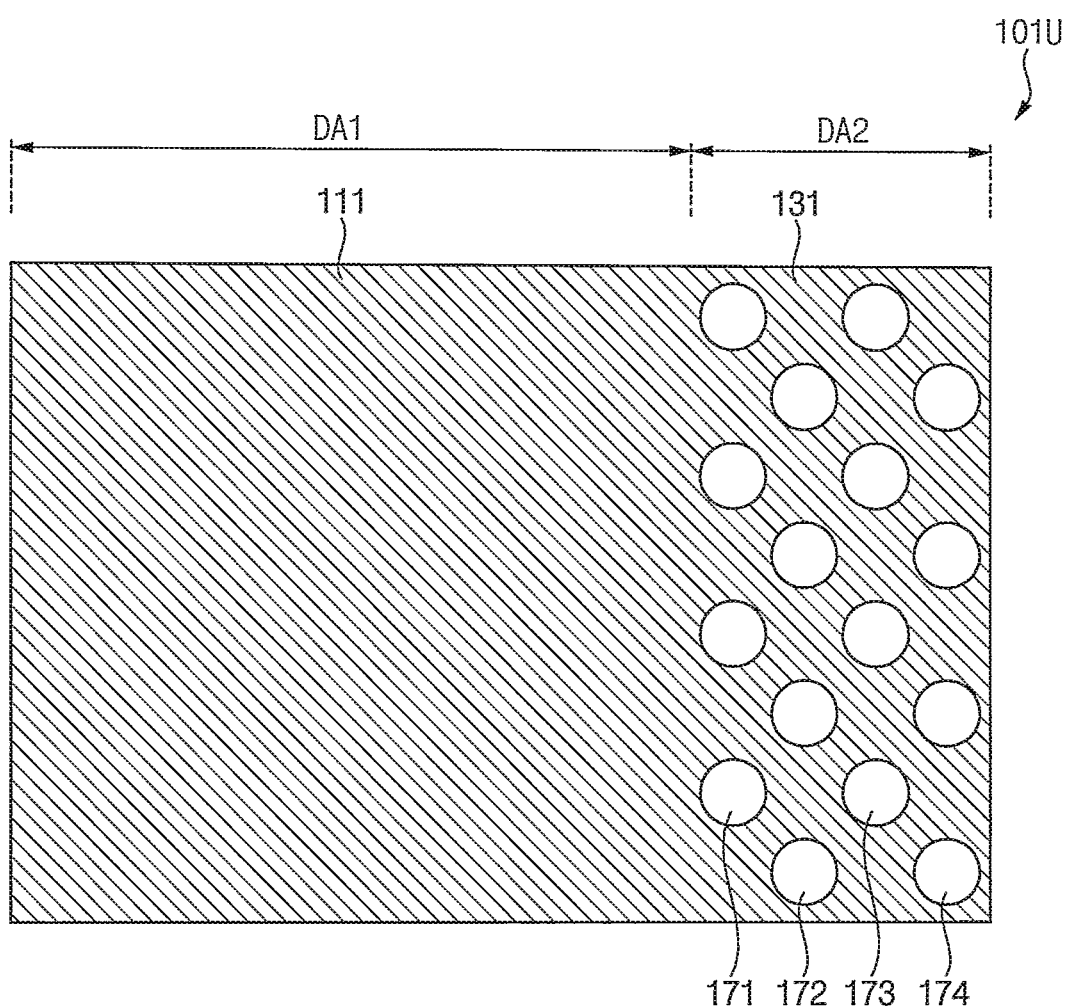
FIG. 11 is a plan view illustrating a support member included in a display device according to another embodiment.

FIG. 11 is a plan view illustrating a support member included in a display device according to another embodiment. For example, FIG. 11 is a plan view illustrating an upper surface 101U of a support member 101 included in a display device according to another embodiment.

Referring to FIG. 11, the support member 101 of the display device according to another embodiment may include a perforated portion 131 in which a plurality of openings 170 having a circular shape are formed in a plan view. (In other words, a cross-sectional shape of each opening 170 may be circular, where the cross-section is taken transverse to a longitudinal axis of the opening 170. The cross-sectional shape may be referred to herein as a "planar shape".) However, the planar shape of the plurality of openings 170 is not limited to the circular shape, and may alternatively have other suitable shapes. The plurality of openings 170 may include a first opening 171, a second opening 172, a third opening 173, and a fourth opening 174 underlaying the flexible area DA2.

Figure 12:
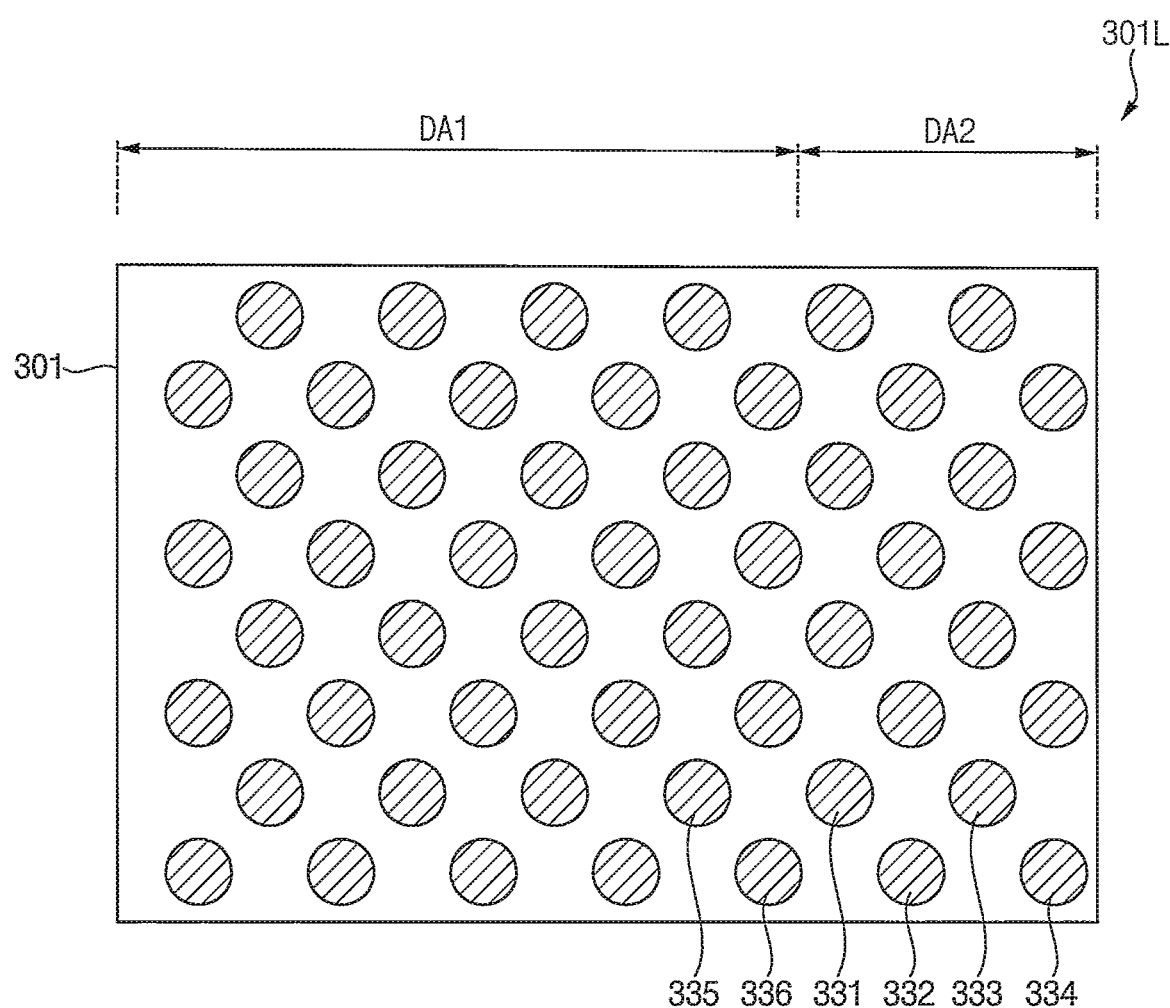
FIG. 12 is a bottom view illustrating an example of a buffer member included in the display device of FIG. 11.

FIG. 12 is a bottom view illustrating an example of a buffer member included in the display device of FIG. 11.

Referring to FIGS. 11 and 12, a plurality of protrusions 330 may include a first protrusion 331, a second protrusion 332, a third protrusion 333, and a fourth protrusion 334 underlaying the flexible area DA2, and a fifth protrusion 335 and a sixth protrusion 336 underlaying the flat area DA1.

The first, second, third, and fourth protrusions 331, 332, 333, and 334 may correspond to the first, second, third, and fourth openings 171, 172, 173, and 174. That is, the positions of the plurality of protrusions 330, the shapes of the plurality of protrusions 330, and the sizes of the plurality of protrusions 330 may correspond to the positions of the plurality of openings 170, the shapes of the plurality of openings 170, and the sizes of the plurality of openings 170, respectively.

In an embodiment, each of the first, second, third, and fourth protrusions 331, 332, 333, and 334 may overlay each of the first, second, third, and fourth openings 171, 172, 173 and 174. A shape of each of the first, second, third, and fourth protrusions 331, 332, 333, and 334 may be substantially the same as a shape of each of the first, second, third, and fourth openings 171, 172, 173, and 174. That is, as the plurality of openings 170 have a circular shape, the plurality of protrusions 330 may have a circular shape. A width of each of the first, second, third, and fourth protrusions 331, 332, 333, and 334 may be substantially the same as a width of each of the first, second, third, and fourth openings 171, 172, 173, and 174. For example, the size of the circular shape of each of the plurality of openings 170 may be substantially the same as the size of the circular shape of each of the plurality of protrusions 330.

By designing the positions of the protrusions 330, the shapes of the protrusions 330, and the sizes of the protrusions 330 corresponding to the positions of the openings 170, the shapes of the openings 170, and the sizes of the openings 170 respectively, the adhesive layer 200 may further fill the openings 170 during a typical process of applying the adhesive layer. Accordingly, adhesion reliability between the support member 100 and the buffer member 301 may be further improved. Accordingly, the adhesive layer 200 may not peel off from the support member 100 over time, and reliability of the display device 1000 may be improved. Further, the provision of the protrusions 330 as described above may allow for a facilitated process of applying the adhesive layer 200, in that the presence of the protrusions 330 may make it easier for an entire space between the upper surface of the support member 100 and a lower surface of the buffer member 300 to be filled with the adhesive material of the adhesive layer 200.

When the protrusions 330 are formed by the gravure printing process, because the protrusions 330 underlay both the flat area DA1 and the flexible area DA2, the manufacturing process to form the protrusions 330 may be facilitated.

Figure 13:
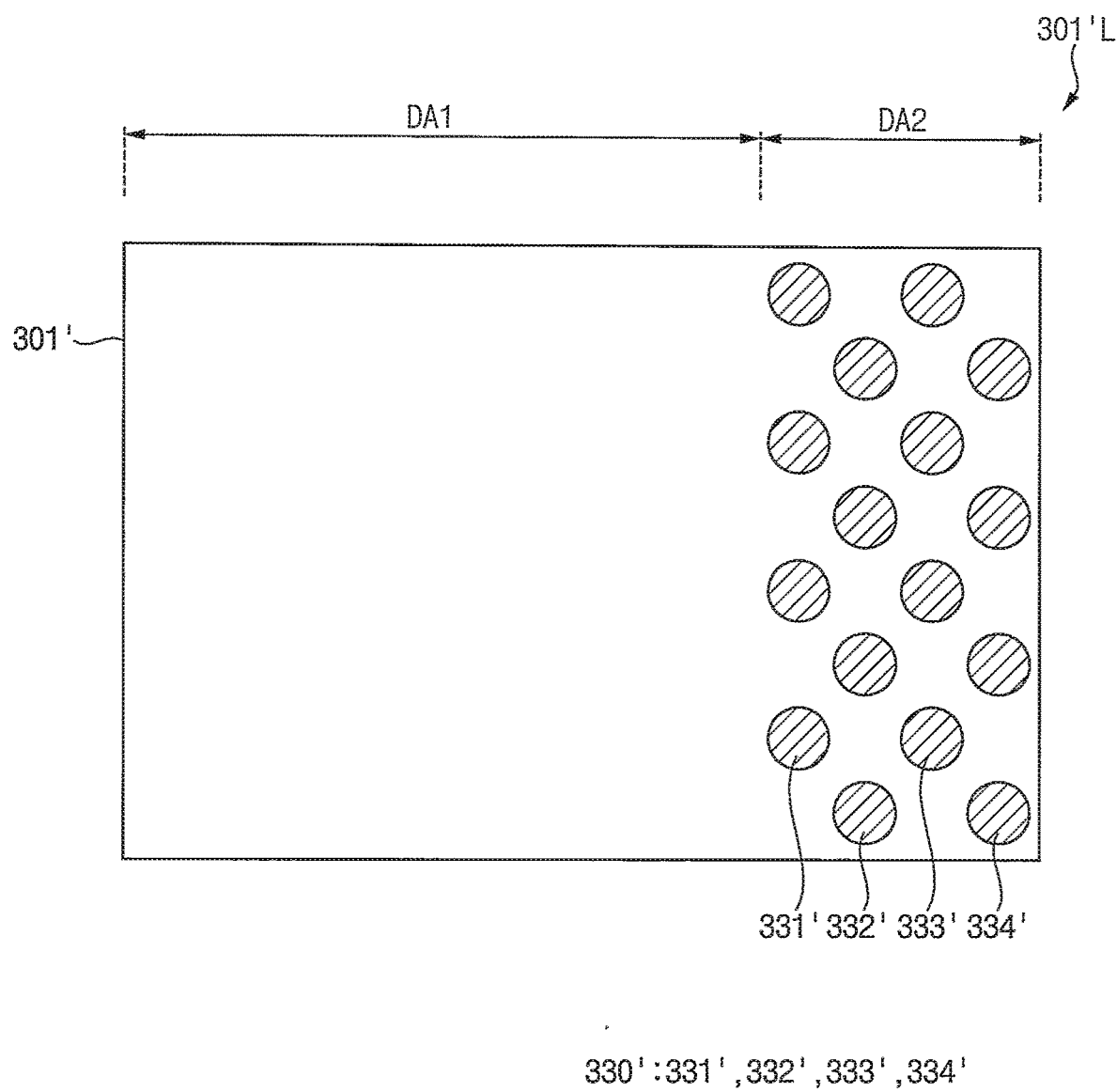
FIG. 13 is a bottom view illustrating another example of a buffer member included in the display device of FIG. 11.

FIG. 13 is a bottom view illustrating another example of a buffer member included in the display device of FIG. 11.

Referring to FIGS. 11 and 13, in the flat area DA1, a bottom surface 301'L of a buffer member 301' may be substantially flat. A plurality of protrusions 330' of the buffer member 301' may underlay only the flexible area DA2 but not the flat area DA1. For example, the protrusions 330' may include a first protrusion 331', a second protrusion 332', a third protrusion 333', and a fourth protrusion 334' underlaying the flexible area DA2.

When the protrusions 330' are formed by the laser patterning process, because the protrusions 330' underlay only the flexible area DA2, the manufacturing process to form the protrusions 330' may be facilitated.

The present inventive concept can be applied to a display device and an electronic device including the same. For example, the present inventive concept may be applied to a high-resolution smartphone, a mobile phone, a smart pad, a smart watch, a tablet PC, a vehicle navigation system, a television, a computer monitor, a notebook computer, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:
   a display panel;
   a support member supporting the display panel and including a perforated portion in which a plurality of openings are formed;
   an adhesive layer having a first portion disposed between the display panel and the support member, having a second portion at least partially filling the plurality of the openings, and including pressure sensitive adhesive; and
   a buffer member disposed between the display panel and the adhesive layer, and including a plurality of protrusions protruding toward the adhesive layer,
   wherein each of the plurality of protrusions overlays and is aligned with a respective one of the plurality of openings.

2. The display device of claim 1, wherein respective cross-sectional shapes of the plurality of openings are the same as those of respective overlaying ones of the plurality of protrusions.

3. The display device of claim 1, wherein a width of each of the plurality of protrusions in a first direction is the same as a width of a respective underlaying one of the plurality of openings in the first direction.

4. The display device of claim 1, wherein the adhesive layer contacts the support member and the buffer member.

5. The display device of claim 1, wherein:
   the display panel includes a flat area and a flexible area adjacent to the flat area;
   the perforated portion underlays the flexible area;
   the support member further includes:
   a main support portion underlaying the flat area, the main support portion having higher rigidity than the perforated portion, and
   wherein no opening is formed in the main support portion.

6. The display device of claim 5, wherein the adhesive layer underlays the flat area and the flexible area, and a portion of the adhesive layer underlaying the flat area is composed of a same material as a portion of the adhesive layer underlaying the flexible area.

7. The display device of claim 5, wherein the plurality of protrusions underlay the flat area and the flexible area.

8. The display device of claim 5, wherein the display panel includes a flat area, and in the flat area, a bottom surface of the buffer member is flat.

9. The display device of claim 1, wherein the plurality of openings penetrate the support member.

10. The display device of claim 1, wherein the support member includes a surface facing the display panel, and the adhesive layer covers an entirety of the surface of the support member.

11. A display device comprising:
    a display panel including a flat area and a flexible area adjacent to the flat area;
    a buffer member disposed under the display panel and including a plurality of protrusions protruding downward;
    a support member disposed under the buffer member and including a perforated portion in which a plurality of openings are formed in the flexible area, each of the plurality of openings underlaying and aligned with a respective one of the plurality of protrusions; and
    an adhesive layer having a first portion disposed between the buffer member and the support member, having a second portion at least partially filling the plurality of openings, and including pressure sensitive adhesive.

12. The display device of claim 11, wherein respective cross-sectional shapes of the plurality of protrusions are the same as those of respective underlaying ones of the plurality of openings.

13. The display device of claim 11, wherein a width of each of the plurality of protrusions in a first direction is the same as a width of a respective underlaying one of the plurality of openings in the first direction.

14. The display device of claim 11, wherein the adhesive layer contacts the support member and the buffer member.

15. The display device of claim 11, wherein the plurality of openings penetrate the support member.

16. A display device comprising:
    a display panel;

a support member underlaying and supporting the display panel and including a flexible portion, the flexible portion including a plurality of openings, wherein the flexible portion forms, together with an overlaying portion of the display panel, a flexible area of the display device; and an adhesive layer including a first portion disposed between an upper surface of the support member and the display panel, and a second portion, the second portion filling an upper portion of the plurality of openings, and including pressure sensitive adhesive, wherein a lower portion of the plurality of openings is adhesive-free.

17. The display device of claim 16, wherein:

the support member includes a rigid portion adjacent to the flexible portion and underlaying a flat area of the display panel such that the flat area of the display panel corresponds to a rigid part of the display device, and the upper portion of the plurality of openings that is filled by the second portion of the adhesive layer extends a distance about halfway down each of the plurality of openings from the upper surface of the support member.

18. A display device comprising:

a display panel;

a support member supporting the display panel and including a perforated portion in which a plurality of openings are formed; and an adhesive layer having a first portion disposed between the display panel and an upper surface of the support member, and having a second portion filling an upper portion of the plurality of the openings, wherein a lower portion of the plurality of openings is adhesive free.

* * * * *